(12) United States Patent
Sturgess

(10) Patent No.: US 7,188,912 B2
(45) Date of Patent: Mar. 13, 2007

(54) BRAKING SYSTEMS

(75) Inventor: Peter Sturgess, Shropshire (GB)

(73) Assignee: JCB Transmissions, Uttoxeter (GB)

( * ) Notice: Subject to any disclaimer, the term of this patent is extended or adjusted under 35 U.S.C. 154(b) by 125 days.

(21) Appl. No.: 11/006,128

(22) Filed: Dec. 7, 2004

(65) Prior Publication Data

US 2005/0140206 A1    Jun. 30, 2005

(30) Foreign Application Priority Data

Dec. 30, 2003   (GB)   ................... 0330115.7

(51) Int. Cl.
*B60T 13/16*   (2006.01)
*B60T 11/10*   (2006.01)
*B60T 11/28*   (2006.01)

(52) U.S. Cl. .................. 303/10; 303/114.1; 188/347; 188/359; 60/547.1

(58) Field of Classification Search ............... 303/10, 303/11, 13, 114.1, 122, 122.09; 188/347, 188/348, 351, 358, 359, 196 A; 91/169, 91/508, 520; 92/53, 75; 60/547.1, 555, 60/581, 593
See application file for complete search history.

(56) References Cited

U.S. PATENT DOCUMENTS 2,407,097 A * 9/1946 Porter .................. 188/359
4,073,543 A   2/1978 Resch ................... 303/10
4,183,215 A * 1/1980 Weber ................. 60/547.1
5,313,795 A * 5/1994 Dunn .................... 91/518
6,378,958 B1  4/2002 Batchelor .............. 303/115.4
6,543,596 B2  4/2003 Martin et al. ......... 192/85 AA

FOREIGN PATENT DOCUMENTS

| EP | 1058024 | 12/2000 |
| EP | 1122455 | 8/2001 |
| FR | 1095835 | 6/1955 |
| JP | 60073134 | 4/1985 |
| WO | WO81/01692 | 6/1981 |

* cited by examiner

*Primary Examiner*—Thomas Williams
(74) *Attorney, Agent, or Firm*—MacMillan, Sobanski & Todd, LLC

(57) ABSTRACT

A braking system includes a brake actuator which is moveable in a first direction to cause a brake applying member to apply a braking force to a member to be braked. A master valve includes a piston assembly which upon operation of a brake operating member, directs the hydraulic fluid under pressure to the brake actuator to apply the brake. A charging valve is operable in first and second states. The master valve piston assembly includes a pair of coupled pistons separated by a chamber. In a first state, the charging valve connects a source of pressurized hydraulic fluid to the master valve chamber to move the pistons apart, directing a volume of hydraulic fluid to the brake actuator. In a second state, the charging valve connects the chamber to a lower pressure area to allow the pair of pistons to be moved towards one another by a restoring force.

25 Claims, 4 Drawing Sheets

BRAKING SYSTEMS

CROSS-REFERENCE TO RELATED APPLICATIONS

Priority is claimed to United Kingdom patent application Serial No. 0330115.7 filed Dec. 30, 2003.

STATEMENT REGARDING FEDERALLY SPONSORED RESEARCH OR DEVELOPMENT

Not Applicable.

TECHNICAL FIELD

This invention relates to a braking system and more particularly to a braking system which includes a brake actuator which is moveable by pressurized hydraulic fluid, against a restoring force, to bring a braking member into contact with a member to be braked to apply braking. More particularly but not exclusively the invention has been developed for a braking system in which the brake actuator moves a brake applying member including a first plurality of discs and the member to be braked is a second plurality of rotating discs interleaved with the plurality of discs of the brake applying member, and when the brake is applied the discs of the brake applying member are moved into contact with the discs of the member to be braked to apply a braking force to the member to be braked.

BACKGROUND OF THE INVENTION

The discs of such a braking system typically are immersed in oil, and the actuator is typically hydraulically powered. The hydraulic fluid which moves the brake applying member is typically supplied by a master valve, commonly referred to as a master cylinder, which includes a piston assembly which is manually moveable, e.g. by a brake pedal, to provide pressurized hydraulic fluid to the brake actuator along a hydraulic fluid line between the master valve and a brake actuator assembly which includes the brake applying member.

Particularly but not exclusively in a "wet disc" brake system, it will be appreciated that a running clearance must be provided between the discs moved by the actuator and the discs of the member to be braked, to prevent uneven wear and/or to reduce parasitic losses resulting from churning of oil between the discs when the brake is not applied. These parasitic drag losses increase exponentially as the relative rotational speed between the discs moved by the brake actuator and the discs of the member to be braked, increases.

However, as more running clearance is provided between the respective discs when the brake is not applied, it will be appreciated that more hydraulic fluid will be required from the master valve to apply the brake, thus requiring greater movements of the foot pedal or other manual brake operating member. Large such manual movements are undesirable.

Large running clearances are really only required at high relative rotational speeds between the discs of the brake applying member and the discs of the member to be braked, i.e. in the case of an earthmoving or load handling machine, at high travelling speeds, e.g. when the machine is being driven in its highest gear at full throttle.

BRIEF SUMMARY OF THE INVENTION

According to a first aspect of the invention we provide a braking system including a brake actuator which is moveable by pressurized hydraulic fluid in a first direction, against a restoring force, to move a brake applying member to apply a braking force to a member to be braked, a master valve, including a piston assembly which upon operation of a brake operating member, directs the hydraulic fluid under pressure to the brake actuator to apply the brake, the system further including a source of pressurized hydraulic fluid, and a charging valve which is operable in first and second states, the piston assembly of the master valve including a pair of coupled pistons, and a chamber between the pair of pistons, the charging valve when operated in a first state communicating the source of pressurized hydraulic fluid to the chamber between the pair of pistons of the master valve, the coupling of the pistons permitting the pistons of the pair to move apart in response, up to a maximum distance thereby to direct up to a predetermined volume of hydraulic fluid to the brake actuator, to move the brake applying member in the first direction towards the member to be braked to reduce a running clearance between them, and the charging valve when operated in the second state, communicating the chamber to a lower pressure area to allow the pair of pistons to be moved towards one another, and thus to permit the brake actuator to move in a second direction opposite to the first direction to increase the running clearance between the brake applying member and the member to be braked.

Thus in a braking system in accordance with the invention, for normal use of the system, e.g. where applied for braking travelling of an earthmoving or load handling machine for examples only, at less than a predetermined speed, the charging valve may be operated in its first state so that the brake actuator is moved in the first direction, so that a braking force may be applied without requiring an unduly great movement of the manual brake operating member, but under predetermined conditions, such as when the machine is travelling at high speeds, the charging valve may be operated in its second state, so as to allow the brake actuator to move in the second direction thereby to achieve a greater running clearance between the member to be braked and the brake applying member, to reduce any parasitic losses occurring as a result of the brake applying member and member to be braked being close. For example, where the invention is applied to a braking system in which the brake applying member and member to be braked include interleaved discs immersed in oil, parasitic losses may be reduced at high travelling speeds by the greater running clearance.

It will be appreciated that when the charging valve is operated in its first state, provided that the pressure of the fluid acting in the chamber between the pistons is sufficient, the fluid will maintain the maximum distance between the pistons notwithstanding that one of the pistons may be moved by the manual brake operating member in the direction of the other piston. If desired, upon operation of the brake operating member, the first piston may be moved to close a fluid inlet to the chamber from the charging valve. By this, or any other suitable arrangement, when the brake is applied by operation of the manual brake operating member, the pair of pistons may move as one in a cylinder of the master valve, to direct pressurized fluid to the brake actuator to apply the brake.

One of the pair of pistons of the pair of pistons of the master valve may include a receiving opening which receives an end region of a projecting part of the second piston of the pair, one of the receiving opening and projecting part including a stop, whilst the other of the receiving opening and projecting parts may include a slot receiving the stop, the pistons being moveable apart when the charging valve is operated in its first state of operation by a distance determined by the extent of movement permitted of the stop in the slot. However many other coupling arrangements are possible which permit the first and second pistons to move together and apart depending on the state of operation of the charging valve. For example, the first and second pistons may be coupled by a fastener, a head of which provides a stop which restricts the moving apart of the pistons.

One of the first and second pistons may include a plunger by means of which, upon movement of the piston in response to operation of the manual brake operating member or pressurized fluid in the chamber between the two pistons, moves hydraulic fluid to the brake actuator which moves the brake applying member in response. Preferably the plunger is moveable by a resilient element such as a spring, to urge the first and second pistons towards one another, so that when the charging valve is switched to its second state of operation, the resilient element moves the pistons relatively towards one another so that fluid will be urged from the chamber to the lower pressure area, so that whilst the brake is not applied, the running clearance between the brake applying member and the member to be braked can be maximized.

The invention is particularly applicable where the braking system is for a machine which includes a ground engaging structure by means of which the machine may travel on the ground, in which case the source of high pressure fluid may be a hydraulic pump which may provide hydraulic fluid for use by other hydraulic fluid operated services of the machine too.

The pump may provide the pressurized hydraulic fluid to an accumulator where the fluid may be stored for use in the chamber between the pair of pistons in the master valve, when required.

In any case, the braking system may include a hydraulic fluid reservoir for the storage of hydraulic fluid for use in applying the brake when the manual brake operating member is operated.

In one embodiment, the low pressure area to which the fluid from the chamber between the pistons may be communicated when the charging valve is operated in its second state of operation, may be the hydraulic fluid reservoir, but in another example, where the braking system is for a machine with a pump, the low pressure area may be a tank of the machine from which the pump draws or to which the pump returns, the hydraulic fluid for use by services of the machine.

The charging valve may be a spool or other kind of valve as required, but preferably is an electrically operated valve such as a solenoid operated, or step motor operated valve, for examples only.

The charging valve may be switched between its first and second operating states by a controller, in response to an input from a sensor device or directly by a switch.

In one example where the braking system is for a machine with a ground engaging structure, the sensor device may sense at least one operating parameter of the machine, or a driver movement or action.

The at least one operating parameter may be operation of a gear selector. For example the sensor device may sense operation of the gear selector to change from top gear to a lower gear and the controller may in response switch the charging valve to the first operating state, and/or conversely the sensor device may sense operation of the gear selector to select top gear and the controller may in response switch the charging valve to the second operating state.

Alternatively the at least one operating parameter may be a movement of an accelerator control. For example the sensor device may sense when the accelerator control is moved to an extent above a threshold value, for example to reduce the-speed of the machine, and the controller may in response switch the charging valve to the first operating state. Conversely, the sensor device may sense when the accelerator control is moved to or near to its maximum extent to select top or near top speed, and the controller may in response switch the charging valve to the second operating state.

Further alternatively the at least one operating parameter may be a movement of a manual brake operating member. For example, the sensor device may sense any operation of the manual brake operating member, and the controller may in response switch the charging valve to the first operating state.

In each of the examples described above, a restoring force to urge the brake actuator against the force exerted by the pressurized hydraulic fluid, for example to release the brake, may be provided by a resilient element such as a spring, or otherwise as required. Whereas such restoring force may also be operable to provide fluid pressure to move the pair of pistons towards one another when the charging valve is operating in its second state of operation, desirably the master valve includes a resilient element such as a spring, to urge the pistons towards one another so that when the charging valve is operated in its second state of operation, fluid may be ejected from the chamber to the low pressure area.

According to a second aspect of the invention we provide a master valve for a braking system according to the first aspect of the invention.

According to a third aspect of the invention we provide a machine with a ground engaging structure by means of which the machine may be driven on the ground, and a braking system according to the first aspect of the invention.

According to a fourth aspect of the invention we provide a method of operating a braking system according to the first aspect of the invention including the steps of switching the operating state of the charging valve in response to operating parameters of a machine in which the braking system is incorporated.

BRIEF DESCRIPTION OF THE DRAWINGS

Embodiments of the invention will now be described with the aid of the accompanying drawings in which.

DETAILED DESCRIPTION OF THE INVENTION

Figure 1:
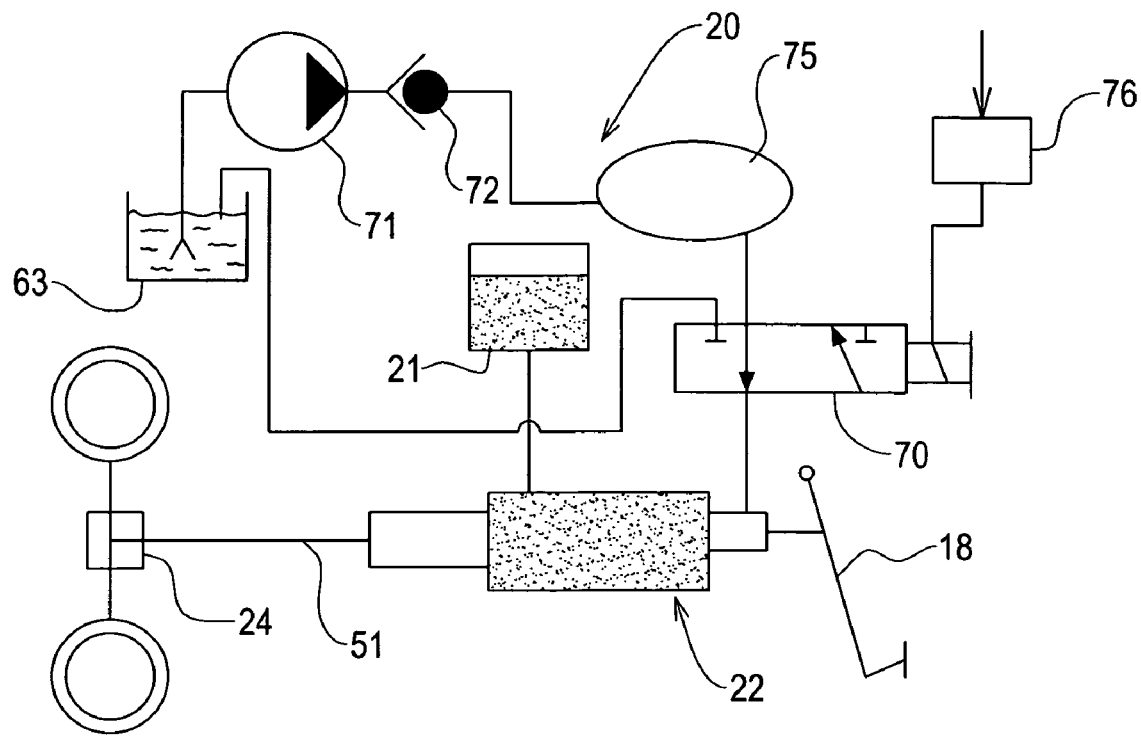
FIG. 1 is an illustrative diagram of a braking system in accordance with the invention where applied to a machine having a pump to supply hydraulic fluid to operate services of the machine.
Figure 4:
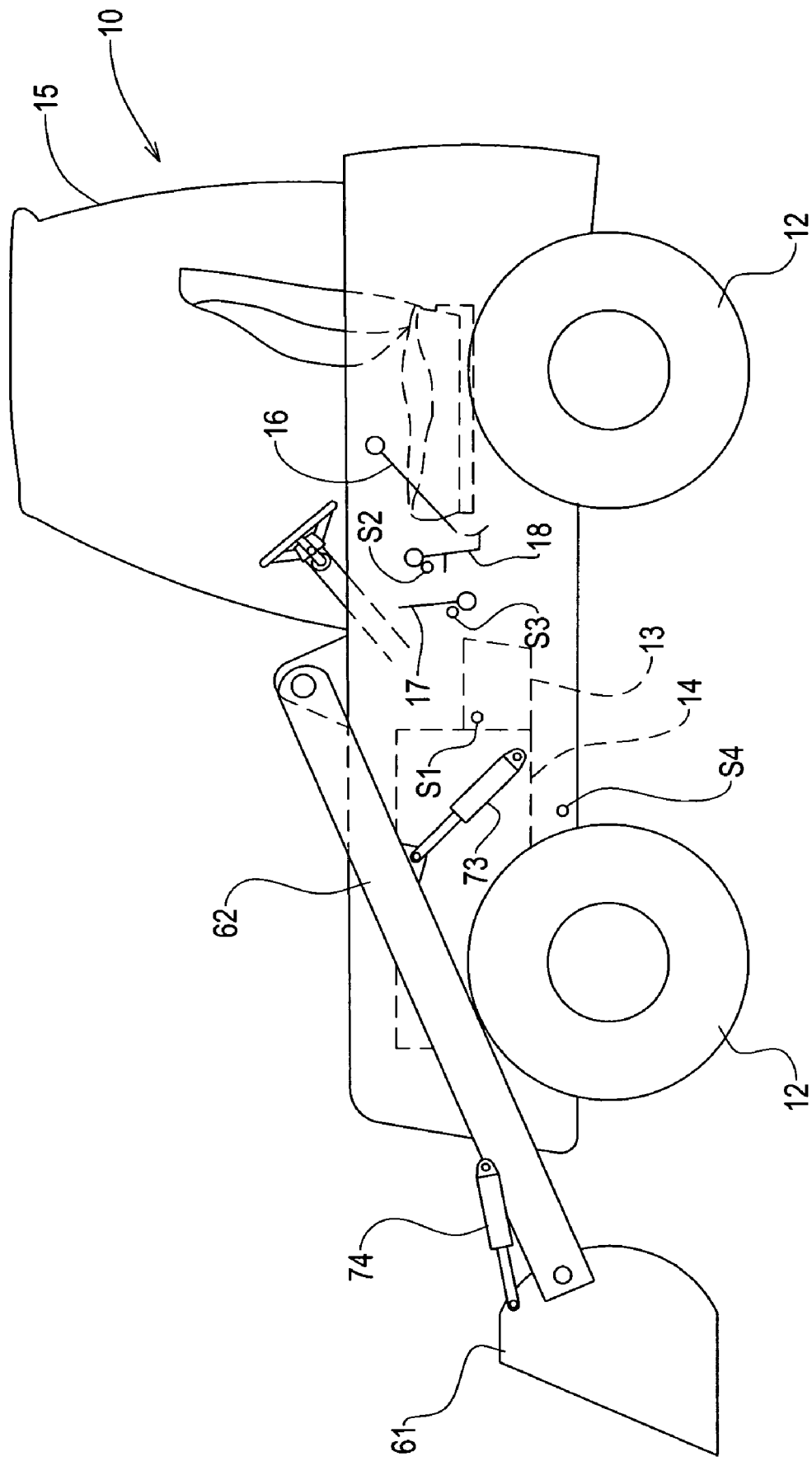
FIG. 4 is an illustrative view of a machine to which the braking assembly of FIG. 1 may be applied.

Referring to FIGS. 1 and 4, an earthmoving machine 10 has a ground engaging structure which in this example includes four wheels 12, which are each driven through a transmission which includes a gearbox 13, from an engine 14. The machine 10 is controlled by an operator from within an operator's cab 15, where there is a gear selector 16, and an accelerator control which in this example is a foot pedal 17, and manual brake operating member, namely a foot brake pedal 18, for manually applying the brakes.

The machine 10 includes a braking system 20. Practically, all four wheels 12 of the machine 10 may have associated brakes, or axles carrying the wheels 12 may be braked, to reduce the speed of the machine 10 as it travels on the ground. In the illustrated example, the machine 10 is braked by braking an axle carrying rear wheels 12 of the ground engaging structure.

The braking system 20 includes a fluid reservoir 21 for hydraulic fluid and from which hydraulic fluid may be drawn and provided to a master valve 22. The master valve 22 includes a piston assembly which will be described below with reference to FIG. 2, which is moveable by the operation of the foot brake pedal 18 to move pressurized hydraulic fluid to move a brake applying member of a brake actuator assembly 24, to apply braking.

Figure 3:
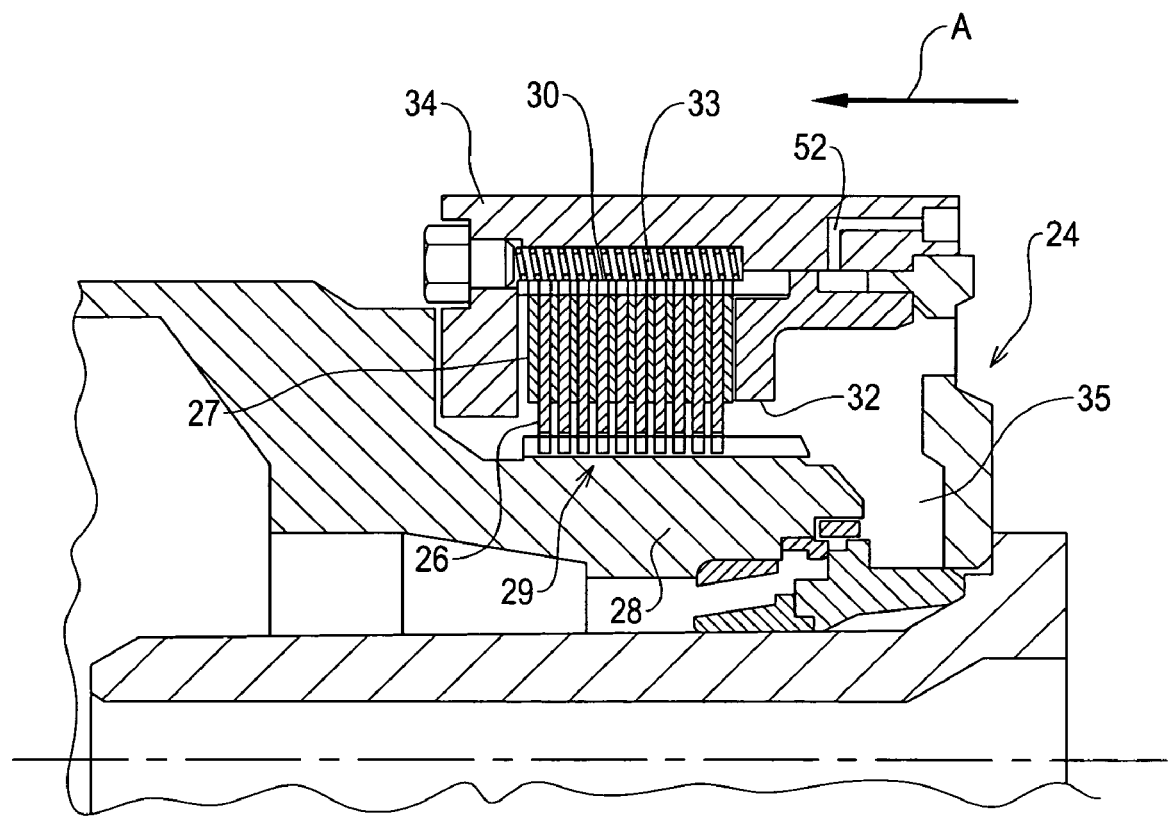
FIG. 3 is an illustrative cross sectional view through a brake actuator assembly of the braking system of FIG. 1.

In FIG. 3 an example of a brake actuating assembly 24 is illustrated. This is a so-called "wet" disc arrangement, which includes a disc pack which includes two sets of discs 26, 27 that rotate in use, relative to one another.

One set of the discs 26 is rotatable with a shaft 28 and thus with the shaft provide a rotating member 29 to be braked. Each disc is therefore a member to be braked. The shaft 28 may be connected to the, or one of the wheels 12 of the machine 10 e.g. via the axle.

The discs of the other set of discs 27 are non-rotatable and each provide a respective brake applying member, the discs 27 all being movable by a brake actuator 32 which in this example is a piston. The discs of the first set 26 are interleaved with the discs of the second set 27 and so each disc 26 has at least one corresponding disc 27 which prior to the brake being applied, are spaced apart by a running clearance, and when the brake is applied, the respective discs 26, 27 are brought into contact.

The discs of the second set 27 are moveable in a first direction indicated by arrow A in FIG. 3, by the brake actuator 32, via a disc mounting member 30 with which the discs 27 are all held fast, towards the discs of the first set 26. Only if the movement of the second disc set 27 in the first direction A is sufficient, will braking be effected as the discs of the first and second sets 26, 27 frictionally engage. The discs 26, 27 are all immersed in oil which is contained in a volume 35 of the brake actuator assembly 24 in which the discs 26, 27 are provided.

A resilient element, namely a spring 33 is provided which is operable to act between the piston 32 and a housing 34 of the brake actuator assembly 24, to urge the piston 32 in a second direction opposite to the first direction A, to tend to move the respective discs 26, 27 away from one another when the brake is released.

Otherwise the brake actuator assembly 24 shown in FIG. 3 is largely conventional.

Referring again to FIG. 1, in accordance with the invention, a running clearances between the discs of the first and second sets 26, 27 may be increased for certain machine 10 operating conditions, to reduce parasitic losses occurring between the discs 26, 27 as a result of churning of the oil in which the discs 26, 27 are immersed. Thus the running clearances between each disc of the first set of discs 26 which are members to be braked, and the each corresponding brake applying member disc 27, may be increased.

Figure 2:
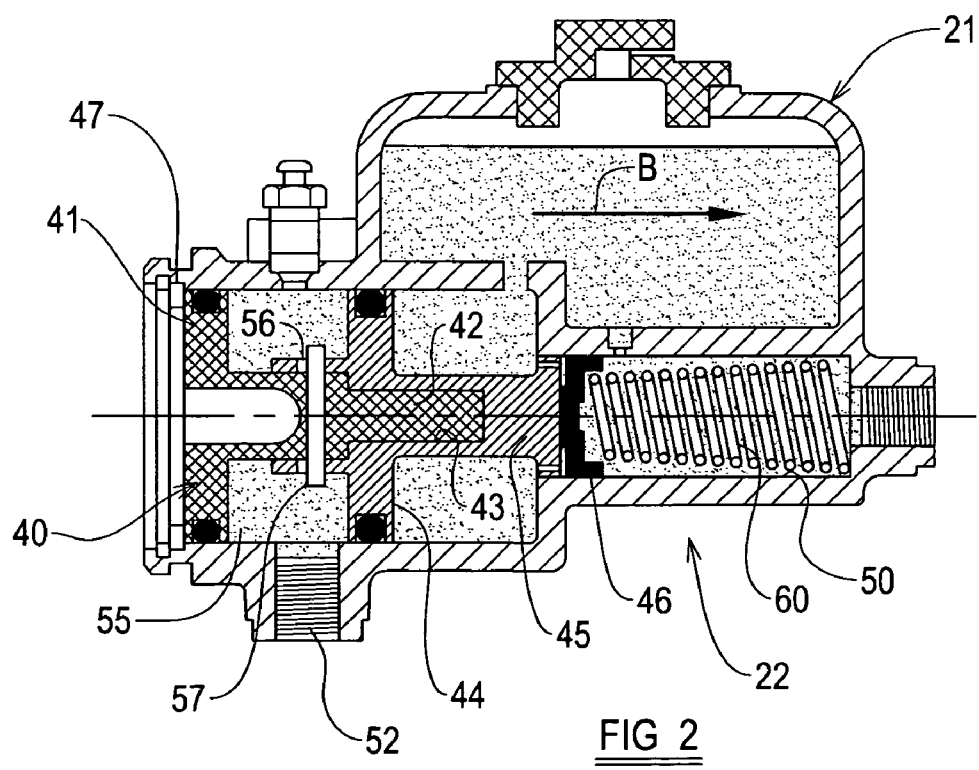
FIG. 2 is an illustrative more detailed and cross sectional view of a master valve of the braking system of FIG. 1.

Referring to FIG. 2, the master valve 22 includes a piston assembly 40 including a first piston 41 which is moveable by the brake foot pedal 18 or other manual brake operating member, to apply the brake, in the direction indicated in FIG. 2, at B. The first piston 41 includes a projecting part 42, an axial end region of which is received in a receiving opening 43 of a second piston 44 of the piston assembly 40. Thus movement of the first piston 41 in direction B in response to the brake pedal 18 being depressed, will result in the second piston 44 moving in direction B also. The second piston 44 includes a projection 45 which upon movement of the second piston 44 in the direction of arrow B, acts on a plunger 46 in a pressure chamber 50, to move pressurized hydraulic fluid along a conduit 51 between the master valve 22 and the brake actuator assembly 24.

When the brake is applied by the operation of the brake foot pedal 18, the movement of the second piston 44 in response, in direction of arrow B will be sufficient to move sufficient hydraulic fluid along a conduit 51 to apply the brake. The pressurized fluid is received in an inlet port 52 of the brake actuator assembly 24 and acts on the piston 32 to bring the discs of the first and second sets 26, 27 into frictional engagement.

In the example illustrated in FIG. 2, the hydraulic fluid reservoir 21 and the master valve 22 are provided as an integral unit but may be separate components as desired.

The first and second pistons 41, 44 have between them a chamber 55, and when, as described below, a highly pressurized fluid is fed into the chamber 55, the pistons 41, 44 are moved apart. However the amount by which they move apart is restricted by virtue of the receiving opening 42 including a slot 56 in which is received a stop 57 in the form of an elongate through pin in this example. Thus as the pistons 41, 44 are moved apart, the stop 57 will ride in the slot 56. The first piston 41 is retained in the chamber by a circlip 47 and so when highly pressurized fluid is introduced into the chamber 55, via a port 52, the second piston 44 will tend to be moved in the direction of arrow B, to move the plunger 46. Such movement will obviously displace hydraulic fluid from the pressure chamber 55, but insufficient fluid will be displaced to actuate the brake. Rather, because of the restricted movement only of the second piston 44 relative to the first piston, such second piston 44 movement will merely reduce the running clearances between the discs of the respective sets 26, 27 of discs.

When pressure is released from the chamber 55 between the pistons 41, 44, there is provided a resilient element which is a coil spring 60 in the operating chamber 50, to move the plunger 46 in a direction opposite to arrow B thus to move the pistons 41, 44 relatively towards one another. The circlip 47 will prevent the first piston 41 moving and consequently, fluid will be displaced from the chamber 55.

Referring now again to FIG. 1 particularly, during normal machine operation, when the machine 10 may be travelling below full speed and perhaps not in top gear, e.g. during earthmoving operations using an earthmoving arm 62 and/or bucket 61, the chamber 55 between the pistons 41, 44 is pressurized to maintain a minimum running clearance between the respective discs 26, 27, but under certain operating conditions, for example when the machine 10 is travelling at a high speed in top gear, the chamber 55 may be depressurized, so that greater running clearances between the discs 26, 27 is maintained. Fluid which is displaced from the chamber 55 by the action of the spring 60 in the pressure chamber 50, in this example passes to a tank 63 of the machine 10 which is a low pressure area.

To control pressurization of the chamber 55, there is provided a charging valve 70 which is operable in two alternative operating states.

In a first state of operation, fluid from a source of pressurized fluid, namely in this example a hydraulic pump 71 of the machine 10, which is provided for supplying pressurized hydraulic fluid from the tank 63 via a one way valve 72, to various services of the machine, such as an actuator 76 for raising the arm 60 or an actuator 74 for tilting the bucket 61. The pump 71 supplies the highly pressurized hydraulic fluid to an accumulator 75, and when the charging valve 70 is in the first operating state as seen in FIG. 1, the highly pressurized fluid will be fed to the chamber 55 between the pair of pistons 41, 44 of the master valve 22, via the inlet port 58. Thus the pistons 41, 44 will be moved apart to reduce the running clearances between the interleaved discs 26, 27 i.e. between the discs 26, 27.

When the charging valve 70 is operated in its second operating state, the accumulator 74 and thus the fluid from the pump 71 will be isolated from the chamber 55, and any fluid displaced from the chamber 55 may pass back though the charging valve 70 to the hydraulic tank 63.

The charging valve 70 is an electrically operated spool valve, a solenoid operated valve in this example, although may be any other desired kind of controllable valve, such as a stepper motor operated valve. The charging valve 70 operation is controlled by a controller 76 which may be a stand alone component or a component integrated with other controllers controlling machine 10 operation.

Although, the charging valve 70 may be operated according to any desired control regime, preferably the controller 76 operates the valve 70 so that minimum running clearances between the respective discs 26, 27 is maintained so that minimum brake foot pedal 18 travel is required to operate the brake, e.g. when performing working tasks such as earthmoving with the machine 10, by operating the charging valve 70 in its first operating state. However, when the machine 10 is travelling on the ground at top speed or nearly top speed, greater running clearances between the discs 26 and 27 may be maintained to minimize parasitic losses, by operating the charging valve 70 in its second operating state.

A sensor device S1 may be provide on the gearbox 13 to sense when the machine 10 is being driven in top gear, and/or a sensor device S2 may be provided to sense operation of the brake foot pedal 18 and/or a sensor device S3 may be provided on the accelerator control pedal 17 and/or a sensor device S4 may be provided to determine road speed, in each case to provide a signal or signals to the controller 76 which responds by switching the charging valve 70 to its second operating state immediately that the gear in which the machine 10 is driven is changed from top gear and/or immediately the brake foot pedal 18 is depressed to reduce machine 10 speed and/or immediately the accelerator pedal 17 is released beyond a threshold and/or immediately road speed reduces beyond a threshold.

Inputs from at least one such sensor S1-S4 may be used as desired by a control algorithm of the controller 76, to ensure that minimal brake foot pedal 18 travel is required when it is desired to apply the brakes, and a maximum running clearance between the respective discs 26, 27 is maintained to reduce parasitic losses when it is safe to do so.

Further features of the invention are as follows.

The system 20 is fail safe in that in the event of the failure of the charging valve 70 or the high pressure fluid supply provided by the accumulator 74 and pump 71, depression of the brake foot pedal 18 will still result in application of the brake, albeit that a greater pedal movement that otherwise would be required, would be necessary. This is because the pair of pistons 41, 44 are only permitted relatively to move a limited amount to change the running clearances between the discs 26, 27.

It will be appreciated that to ensure that in normal operation the application of the brake applying force to the brake foot pedal 18 or other manual operating member does not displace fluid from the chamber 55 between the pair of pistons 41, 44, and thus permit the pistons 41, 44 to move together, the pressure of the fluid from the accumulator 73 and pump 71 needs to be capable of supporting the brake application force in the master valve 22. Whereas this is readily achievable where the highly pressurized fluid is sourced from the pump 71 of the machine 10, in another example an alternative high pressure fluid source may provide such highly pressurized fluid.

In another example, the first piston 41 and the inlet port 52 are so arranged, that upon initial movement of the first piston 41 when the brake is applied, the inlet port 52 is closed so as to seal the chambers 55, to ensure that fluid is not displace from the chamber 55. Such an arrangement is shown in FIG. 5.

Figure 5:
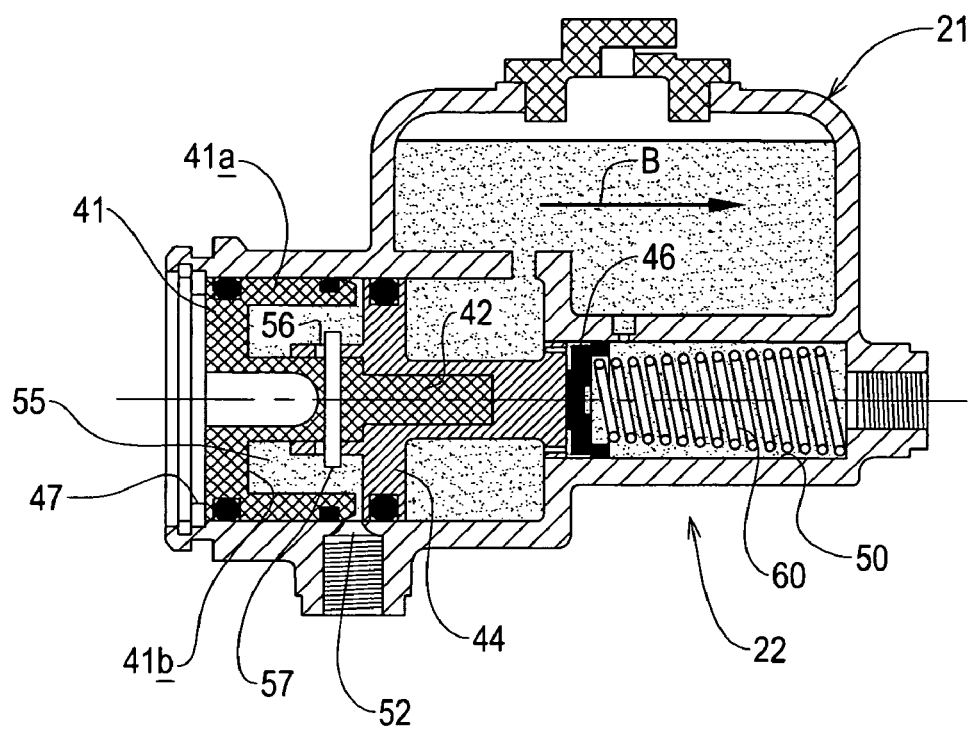
FIG. 5 shows a master valve similar to that of FIG. 2, but modified.

In FIG. 5 it can be seen that the first piston 41 is elongate having a cylindrical side wall 41a and an internal hollow 41b. Otherwise the master valve 22 is similar to that shown in and described with reference to FIG. 2.

When the charging valve 70 is operated in its first operating state, and the chamber 55 is pressurized, when the brake is applied and the first piston 41 moves in the direction of arrow B, the cylindrical side wall 41a of the first piston will close the inlet port 52, which is especially configured for this purpose, to seal the chamber 55.

Figure 6:
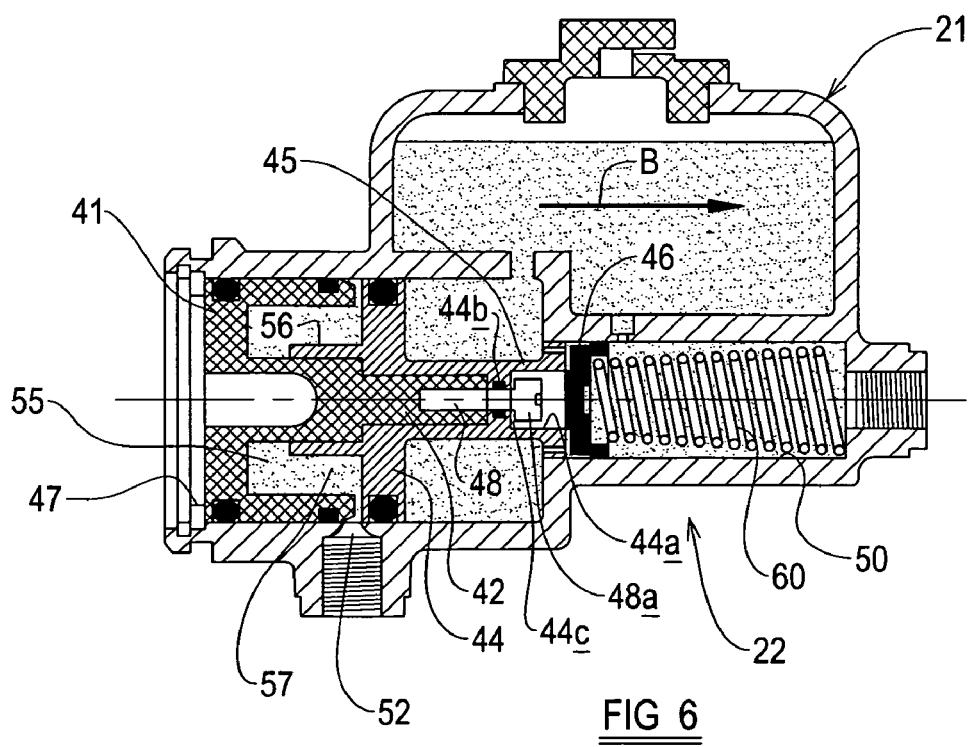
FIG. 6 shows a master valve similar to that of FIG. 5, but further modified.

In FIG. 6, an alternative arrangement for restricting the movement apart of the first and second pistons 41, 44 is shown. Instead of the slot 56 and pin 57 arrangement of FIG. 2, the second piston 44 includes an axial recess 44a from the end adjacent the plunger 46, which is separated from the receiving formation 43 which receives the projecting part 42 of the first piston 41, by an end wall 44b. A setting bolt 48 is connected to the projecting part 42 of the first piston 41, with the head 48a of the bolt 48 in the axial recess 44a and a shank of the bolt 48 passing through a seal, through an opening in the end wall 44b. A small clearance 44c between the head 48a and the end wall 44b controls the extent to which the pistons 41, 44 may move apart when chamber 55 is pressurized.

Otherwise the variants shown in FIGS. 5 and 6 operate as the valve 22 of FIG. 2 and similar parts are labeled with the same references.

Various other modifications are possible without departing from the scope of the invention. For example the invention may be applied to other than multiple wet disc type brake systems, where it is desired to increase the running clearance between a brake applying member 30 and the member 28 to be braked under certain operating conditions. The invention is not only applicable to an earthmoving machine 10 but may be applied to loading machines, cranes, tractors and the like, and other vehicles including automobiles, trucks and lorries, or to non-mobile industrial plant where there is a manually operated braking member or a non-manual brake operating member to apply the brake.

The invention may be applied to brake systems where there are multiple brake pedals 18 or other manually operated braking member, such as for example where there are two brake pedals 18, one for each rear brake. In such an arrangement a common charging valve 70 may be provided for both brakes, and a master valve 22 for each brake may be incorporated in a common master valve housing.

Provision of the invention does not preclude the provision of servo assistance, or other powered braking, or of safety systems such as an ABS system.

The invention claimed is:

1. A braking system including a brake actuator which is moveable by pressurized hydraulic fluid in a first direction, against a restoring force, to move a brake applying member to apply a braking force to a member to be braked, a master valve, including a piston assembly which upon operation of a brake operating member, directs the hydraulic fluid under pressure to the brake actuator to apply the brake, the system further including a source of pressurized hydraulic fluid, and a charging valve which is operable in first and second states, the piston assembly of the master valve including a pair of coupled pistons, a controller connected to change the operating state of the charging valve in response to an input from a sensor, and a chamber between the pair of pistons, the charging valve when operated in a first state communicating the source of pressurized hydraulic fluid to the chamber between the pair of pistons of the master valve, the coupling of the pistons permitting the pistons of the pair to move apart in response, up to a maximum distance thereby to direct up to a predetermined volume of hydraulic fluid to the brake actuator, to move the brake applying member in the first direction towards the member to be braked to reduce a running clearance between them, and the charging valve when operated in the second state, communicating the chamber to a lower pressure area to allow the pair of pistons to be moved towards one another, and thus to permit the brake actuator to move in a second direction opposite to the first direction to increase the running clearance between the brake applying member and the member to be braked.

2. A breaking system including a brake actuator which is moveable by pressurized hydraulic fluid in a first direction, against a restoring force, to move a brake applying member to apply a braking force to a member to be braked, a master valve, including a piston assembly which upon operation of a brake operating member, directs the hydraulic fluid under pressure to the brake actuator to apply the brake, the system further including a source of pressurized hydraulic fluid, and a charging valve which is operable in first and second states, the piston assembly of the master valve including a pair of coupled pistons, and a chamber between the pair of pistons, the charging valve when operated in a first state communicating the source of pressurized hydraulic fluid to the chamber between the pair of pistons of the master valve, the coupling of the pistons permitting the pistons of the pair to move apart in response, up to a maximum distance thereby to direct up to a predetermined volume of hydraulic fluid to the brake actuator, to move the brake applying member in the first direction towards the member to be braked to reduce a running clearance between them, and the charging valve when operated in the second state, communicating the chamber to a lower pressure area to allow the pair of pistons to be moved towards one another, and thus to permit the brake actuator to move in a second direction opposite to the first direction to increase the running clearance between the brake applying member and the member to be braked, wherein the system is employed in a machine which travels on the ground, and at less than a predetermined speed, the charging valve is operated in its first state so that the brake actuator is moved in the first direction, but when the machine is traveling at high speeds, the charging valve is operated in its second state, so as to allow the brake actuator to move in the second direction thereby to achieve a greater running clearance between the member to be braked and the brake applying member.

3. A system according to claim 1 wherein the brake applying member and member to be braked include interleaved discs immersed in oil.

4. A system according to claim 1 wherein when the charging valve is operated in its first state, the pressure of the high pressure fluid from the source acting in the chamber between the pistons is sufficient to maintain the maximum distance between the pistons during manual brake operating member operation, so that the pair of pistons move as one, to direct pressurized fluid to the brake actuator to apply the brake.

5. A system according to claim 1 wherein when the charging valve is operated in its first state and upon operation of the brake operating member, the first piston is moved to close a fluid inlet to the chamber from the charging valve.

6. A braking system including a brake actuator which is moveable by pressurized hydraulic fluid in a first direction, against a restoring force, to move a brake applying member to apply a braking force to a member to be braked, a master valve, including a piston assembly which upon operation of a brake operating member, directs the hydraulic fluid under pressure to the brake actuator to apply the brake, the system further including a source of pressurized hydraulic fluid, and a charging valve which is operable in first and second states, the piston assembly of the master valve including a pair of coupled pistons, and a chamber between the pair of pistons, the charging valve when operated in a first state communicating the source of pressurized hydraulic fluid to the chamber between the pair of pistons of the master valve, the coupling of the pistons permitting the pistons of the pair to move apart in response, up to a maximum distance thereby to direct up to a predetermined volume of hydraulic fluid to the brake actuator, to move the brake applying member in the first direction towards the member to be braked to reduce a running clearance between them, and the charging valve when operated in the second state, communicating the chamber to a lower pressure area to allow the pair of pistons to be moved towards one another, and thus to permit the brake actuator to move in a second direction opposite to the first direction to increase the running clearance between the brake applying member and the member to be braked, wherein one of the pair of pistons of the master valve includes a receiving opening which receives an end region of a projecting part of the second piston of the pair, one of the receiving opening and projecting part including a stop whilst the other of the receiving opening and projecting part includes a slot receiving the stop, the pistons being moveable apart when the charging valve is operated in its first state of operation by a distance determined by the extent of movement permitted of the stop in the slot.

7. A braking system including a brake actuator which is moveable by pressurized hydraulic fluid in a first direction, against a restoring force, to move a brake applying member to apply a braking force to a member to be braked, a master valve, including a piston assembly which upon operation of a brake operating member, directs the hydraulic fluid under pressure to the brake actuator to apply the brake, the system further including a source of pressurized hydraulic fluid, and a charging valve which is operable in first and second states, the piston assembly of the master valve including a pair of coupled pistons, and a chamber between the pair of pistons, the charging valve when operated in a first state communicating the source of pressurized hydraulic fluid to the chamber between the pair of pistons of the master valve, the coupling of the pistons permitting the pistons of the pair to move apart in response, up to a maximum distance thereby to direct up to a predetermined volume of hydraulic fluid to the brake actuator, to move the brake applying member in the first direction towards the member to be braked to reduce a running clearance between them, and the charging valve when operated in the second state, communicating the chamber to a lower pressure area to allow the pair of pistons to be moved towards one another, and thus to permit the brake actuator to move in a second direction opposite to the first direction to increase the running clearance between the brake applying member and the member to be braked, wherein the first and second pistons are coupled by a fastener, a head of which provides a stop which restricts the moving apart of the pair of pistons.

8. A system according to claim 1 wherein one of the first and second pistons includes a plunger by means of which, upon movement of the piston in response to operation of the manual brake operating member or pressurized fluid in the chamber between the two pistons, hydraulic fluid is moved to the brake actuator which moves the brake applying member in response.

9. A system according to claim 8 wherein the plunger is moveable by a resilient element to urge the first and second pistons towards one another, so that when the charging valve is switched to its second state of operation, the resilient element moves the pistons relatively towards one another so that fluid is urged from the chamber to the lower pressure area, so that whilst the brake is not applied, the running clearance between the brake applying member and the member to be braked can be maximized.

10. A system according to claim 1 wherein the braking system is employed in a machine which includes a ground engaging structure by means of which the machine may travel on the ground, and the source of pressurized fluid is a hydraulic pump which provides hydraulic fluid for use by other hydraulic fluid operated services of the machine.

11. A system according to claim 10 wherein the pump provides the pressurized hydraulic fluid to an accumulator where the fluid is stored for use in the chamber between the pair of pistons in the master valve, when required.

12. A system according to claim 1 wherein the braking system includes a hydraulic fluid reservoir for the storage of hydraulic fluid for use in applying the brake when the manual brake operating member is operated, and the low pressure area to which the fluid from the chamber between the pistons is communicated when the charging valve is operated in its second state of operation, is the hydraulic fluid reservoir.

13. A system according to claim 10 wherein the low pressure area is a tank of the machine from which the pump draws or to which the pump returns, the hydraulic fluid for use by services of the machine.

14. A braking system including a brake actuator which is moveable by pressurized hydraulic fluid in a first direction, against a restoring force, to move a brake applying member to apply a braking force to a member to be braked, a master valve, including a piston assembly which upon operation of a brake operating member, directs the hydraulic fluid under pressure to the brake actuator to apply the brake, the system further including a source of pressurized hydraulic fluid, and a charging valve which is operable in first and second states, the piston assembly of the master valve including a pair of coupled pistons, and a chamber between the pair of pistons, the charging valve when operated in a first state communicating the source of pressurized hydraulic fluid to the chamber between the pair of pistons of the master valve, the coupling of the pistons permitting the pistons of the pair to move apart in response, up to a maximum distance thereby to direct up to a predetermined volume of hydraulic fluid to the brake actuator, to move the brake applying member in the first direction towards the member to be braked to reduce a running clearance between them, and the charging valve when operated in the second state, communicating the chamber to a lower pressure area to allow the pair of pistons to be moved towards one another, and thus to permit the brake actuator to move in a second direction opposite to the first direction to increase the running clearance between the brake applying member and the member to be braked, wherein the charging valve is an electrically operated valve.

15. A system according to claim 14 wherein the charging valve is switched between its first and second operating states by a controller, in response to an input from a sensor device.

16. A system according to claim 15 wherein the braking system is for a machine with a ground engaging structure, the sensor device sensing at least one operating parameter of the machine.

17. A system according to claim 16 wherein the at least one operating parameter is operation of a gear selector, the sensor device sensing operation of the gear selector to change from top gear to a lower gear, the controller in response, switching the charging valve to the first operating state.

18. A system according to claim 16 wherein the sensor device senses operation of the gear selector to select top gear, the controller in response, switching the charging valve to the second operating state.

19. A system according to claim 16 wherein the at least one operating parameter is a movement of an accelerator control, the sensor device sensing when the accelerator control is moved to an extent above a threshold value, to reduce the speed of the machine, the controller in response switching the charging valve to the first operating state.

20. A system according to claim 16 wherein the sensor device senses when the accelerator control is moved to or near to its maximum extent to select top or near top speed, the controller in response switching the charging valve to the second operating state.

21. A system according to claim 16 wherein the at least one operating parameter is a movement of a manual brake operating member, the controller in response, switching the charging valve to the first operating state.

22. A system according to claim 1 wherein a restoring force to urge the brake actuator against the force exerted by the pressurized hydraulic fluid, to release the brake, is provided by a resilient element, the restoring force also being operable to provide fluid pressure to move the pair of pistons relative towards one another when the charging valve is operating in its second state of operation.

23. A system according to claim 1 wherein the master valve includes a resilient element to urge the pistons towards one another so that when the charging valve is operated in its second state of operation, fluid is ejected from the chamber to the low pressure area.

24. A machine with a ground engaging structure by means of which the machine is drivable on the ground, the machine having a braking system including a brake actuator which is moveable by pressurized hydraulic fluid in a first direction, against a restoring force, to move a brake applying member to apply a braking force to a member to be braked, a master valve, including a piston assembly which upon operation of a brake operating member, directs the hydraulic fluid under pressure to the brake actuator to apply the brake, the system further including a source of pressurized hydraulic fluid, and a charging valve which is operable in first and second states, the piston assembly of the master valve including a pair of coupled pistons, and a chamber between the pair of pistons, a controller connected to change the operating state of the charging valve in response to an input from a sensor, the charging valve when operated in a first state communicating the source of pressurized hydraulic fluid to the chamber between the pair of pistons of the master valve, the coupling of the pistons permitting the pistons of the pair to move apart in response, up to a maximum distance thereby to direct up to a predetermined volume of hydraulic fluid to the brake actuator, to move the brake applying member in the first direction towards the member to be braked to reduce a running clearance between them, and the charging valve when operated in the second state, communicating the chamber to a lower pressure area to allow the pair of pistons to be moved towards one another, and thus to permit the brake actuator to move in a second direction opposite to the first direction to increase the running clearance between the brake applying member and the member to be braked.

25. A method of operating a braking system including a brake actuator which is moveable by pressurized hydraulic fluid in a first direction, against a restoring force, to move a brake applying member to apply a braking force to a member to be braked, a master valve, including a piston assembly which upon operation of a brake operating member, directs the hydraulic fluid under pressure to the brake actuator to apply the brake, the system further including a source of pressurized hydraulic fluid, and a charging valve which is operable in first and second states, the piston assembly of the master valve including a pair of coupled pistons, and a chamber between the pair of pistons, the charging valve when operated in a first state communicating the source of pressurized hydraulic fluid to the chamber between the pair of pistons of the master valve, the coupling of the pistons permitting the pistons of the pair to move apart in response, up to a maximum distance thereby to direct up to a predetermined volume of hydraulic fluid to the brake actuator, to move the brake applying member in the first direction towards the member to be braked to reduce a running clearance between them, and the charging valve when operated in the second state, communicating the chamber to a lower pressure area to allow the pair of pistons to be moved towards one another, and thus to permit the brake actuator to move in a second direction opposite to the first direction to increase the running clearance between the brake applying member and the member to be braked, the method including the steps of switching the operating state of the charging valve in response to a sensor sensing a varying operating parameters of a machine in which the braking system is incorporated.

* * * * *